United States Patent [19]
Glessner et al.

[11] Patent Number: 5,760,705
[45] Date of Patent: Jun. 2, 1998

[54] SYSTEM FOR MAINTAINING RECEIVER/ TRANSMITTER SYNCHRONIZATION WITH TWO-WAY PAGERS

[75] Inventors: David W. Glessner; Edward J. Anthony; John M. Reyland, Jr., all of Quincy, Ill.

[73] Assignee: Glenayre Electronics, Inc., Charlotte, N.C.

[21] Appl. No.: 522,871

[22] Filed: Sep. 1, 1995

[51] Int. Cl.$^6$ .................................................. H04Q 7/14
[52] U.S. Cl. ...................... 340/825.44; 340/825.44; 340/825.21; 455/38.2; 455/51.1
[58] Field of Search ................ 340/825.44, 825.2, 340/825.21, 825.54, 825.08; 455/51.1, 38.2, 13.2; 379/56, 57

[56] References Cited

U.S. PATENT DOCUMENTS

| | | |
|---|---|---|
| 4,875,038 | 10/1989 | Siwiak et al. . |
| 4,882,579 | 11/1989 | Siwiak . |
| 4,891,637 | 1/1990 | Siwiak et al. . |
| 4,918,437 | 4/1990 | Jasinski et al. ............... 340/825.44 |
| 5,005,014 | 4/1991 | Jasinski . |
| 5,124,697 | 6/1992 | Moore . |
| 5,142,279 | 8/1992 | Jasinski et al. . |
| 5,162,790 | 11/1992 | Jasinski ...................... 340/825.44 |
| 5,168,271 | 12/1992 | Hoff . |
| 5,168,493 | 12/1992 | Nelson et al. ............ 340/825.44 X |
| 5,335,246 | 8/1994 | Yokev et al. . |
| 5,355,529 | 10/1994 | Linquist et al. ............. 455/51.1 X |

*Primary Examiner*—Edwin C. Holloway, III
*Attorney, Agent, or Firm*—Christensen O'Connor; Johnson & Kindness

[57] ABSTRACT

A two-way paging system (10) includes a plurality of personal paging units (16). The personal paging units (16) receive pages (18), and generate radio signals (28) in response to the pages. The system includes a transmitter (12) for generating the pages, and a receiver (14). The receiver includes first and second receiving circuitry (30) and (34). The first receiving circuitry receives radio signals from the personal paging units. The second receiving circuitry receives radio signals from a source other than the personal paging units. The receiver further includes a data processor (32) electronically linked with the first and second receiving circuitry in the receiver. The data processor determines the time period during which radio signals are received from the personal paging units by the first receiving circuitry, based on radio signals received from the other source by the second receiving circuitry. In a preferred embodiment, the second receiving circuitry receives radio signals from the transmitter.

22 Claims, 4 Drawing Sheets

1

SYSTEM FOR MAINTAINING RECEIVER/ TRANSMITTER SYNCHRONIZATION WITH TWO-WAY PAGERS

FIELD OF THE INVENTION

The present invention relates generally to paging systems, and more particularly to two-way paging systems.

BACKGROUND OF THE INVENTION

Most paging systems employ personal paging units that can only receive pages. These paging units, called receive-only pagers, cannot acknowledge whether a page has been received or transmit any other kind of information. To acknowledge page receipt, or transmit other information, the page recipient must communicate with the sender using another system, such as a telephone.

In contrast, two-way paging systems employ personal paging units that can receive pages, and also acknowledge receipt of pages. Additionally, many paging system equipment providers are developing two-way paging systems that can transmit other information, such as responses to electronic mail ("E-mail") messages.

Consumers of telecommunication and paging services prefer two-way paging systems because these systems are more convenient for exchanging personal communications as compared to one-way, or receive-only paging systems. Thus, paging system equipment providers are working to produce reliable, cost-efficient two-way paging systems.

Generally, two-way paging systems include transmitters for sending pages to the personal paging units, and receivers for receiving acknowledgments or other information from the personal paging units. In some two-way paging systems, the transmitters send pages to individual personal paging units with a command that a given unit acknowledge page receipt, or send other information, during a certain time slot or period. Thus, the transmitters can command personal paging units to transmit acknowledgments or return signals during different time slots to prevent congestion.

However, to maximize communications, these systems must closely synchronize the receivers with the transmitters. That is, the receivers must be capable of listening for a personal paging unit transmission during a time slot corresponding to the same time slot commanded by the transmitters. The present invention provides an improved way for closely synchronizing the receivers with the transmitters.

SUMMARY OF THE INVENTION

The present invention provides a two-way paging system. In particular, the system includes a plurality of personal paging units that receive pages and generate radio signals in response to the pages. The system includes a transmitter for generating the pages, and a receiver.

The receiver includes first and second receiving circuitry. The first receiving circuitry receives radio signals from the personal paging units. The second receiving circuitry receives radio signals from a source other than the personal paging units.

The receiver further includes a data processor electronically linked with the first and second receiving circuitry in the receiver. The data processor determines the time slot or period during which signals are received from the personal paging units by the first receiving circuitry, based on signals received from the other source by the second receiving circuitry.

In a preferred embodiment, the second receiving circuitry receives signals in the form of frames from the transmitter. Specifically, the transmitter generates frames that include the pages, and a synchronization portion having information indicative of the frame number and time slot boundaries. Individual time slots can be identified as a fixed offset from where the synchronization portion occurs. The data processor determines the time slot for reception of signals from the personal paging units by the first receiving circuitry based on the synchronization portion of frames received from the transmitter.

Preferably, the transmitter generates the frames at a first predefined periodic rate. To accurately determine the time slot for reception, the receiver can sample the signal from the transmitter at a second predefined periodic rate based on information from the internal clock in the data processor for the receiver. Assuming the first and second predefined rates are accurate, the data processor in the receiver can determine an expected number of samples that would be obtained for a predefined number of frames. Additionally, the data processor in the receiver can count an actual number of samples obtained from the transmitter at the second predefined periodic rate for the predefined number of frames. Based on the difference between the expected number of samples and the actual number of samples, the receiver's data processor can determine the accuracy of its internal clock, and make adjustments accordingly. The synchronization portion in each frame permits the receiver to distinguish the start of a succeeding frame from the end of a preceding frame.

In another preferred embodiment of the invention, the second receiving circuitry includes a selected one of the personal paging units, referred to herein as a "timing unit." That is, the timing unit acts as the second receiving circuitry for the receiver.

More specifically, the timing unit receives the frames from the transmitter, which the transmitter generates at regular, periodic intervals. In response to detecting the synchronization portion in each frame, the timing unit generates a radio signal during a predefined time slot that the receiver receives. The data processor in the receiver determines the time slot or period during which signals are received from one or more other personal paging units, based on the signals received from the timing unit. In this way, the receiver and transmitter can be synchronized with one another. Preferably, the timing unit is located close to the receiver.

In another preferred embodiment, the second receiving circuitry in the receiver receives radio signals from satellites. In this embodiment, the transmitter also includes receiving circuitry that receives radio signals from satellites. The signals from the satellites include timing information, such that the transmitter and receiver can synchronize with one another.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

3

Figure 3:
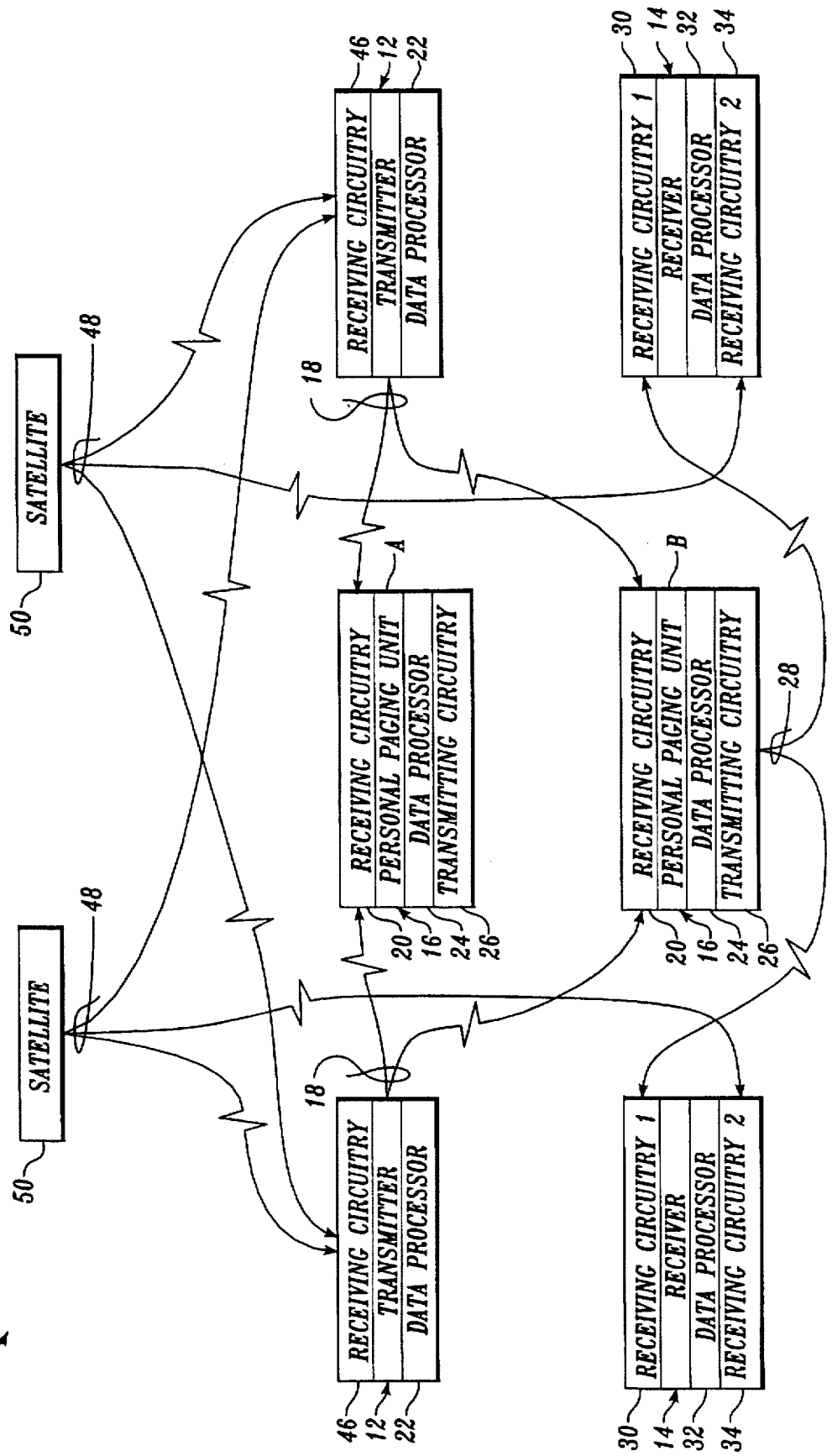
Figure 4:
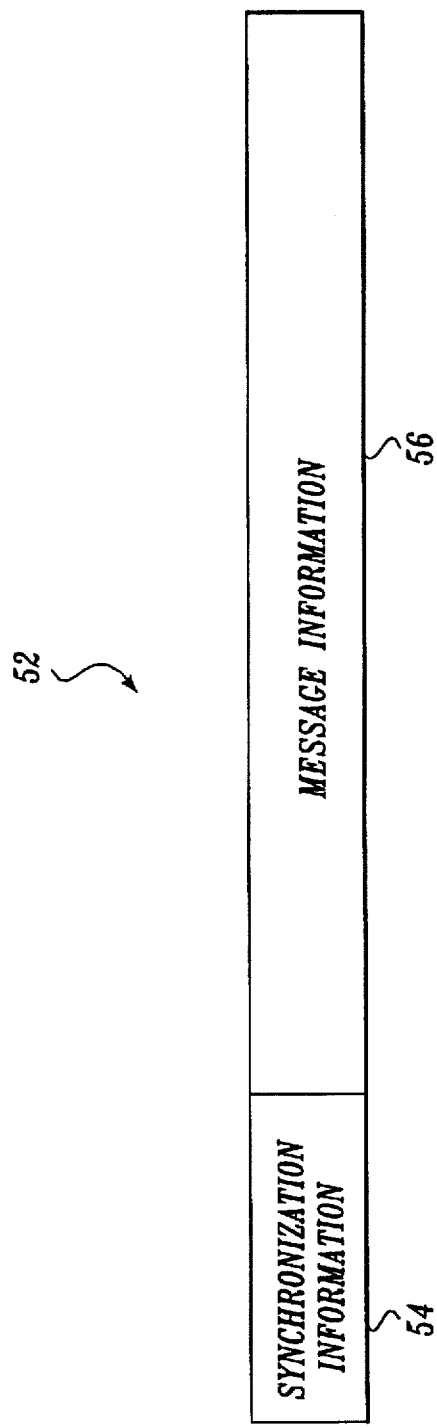

FIG. 3 is a schematic diagram of another alternative embodiment of the invention in which a transmitter also includes receiving circuitry; and FIG. 4 is a schematic representation of a frame sent by the transmitter of a system in accordance with the present invention.

DETAILED DESCRIPTION OF THE PREFERRED EMBODIMENTS

Figure 1:
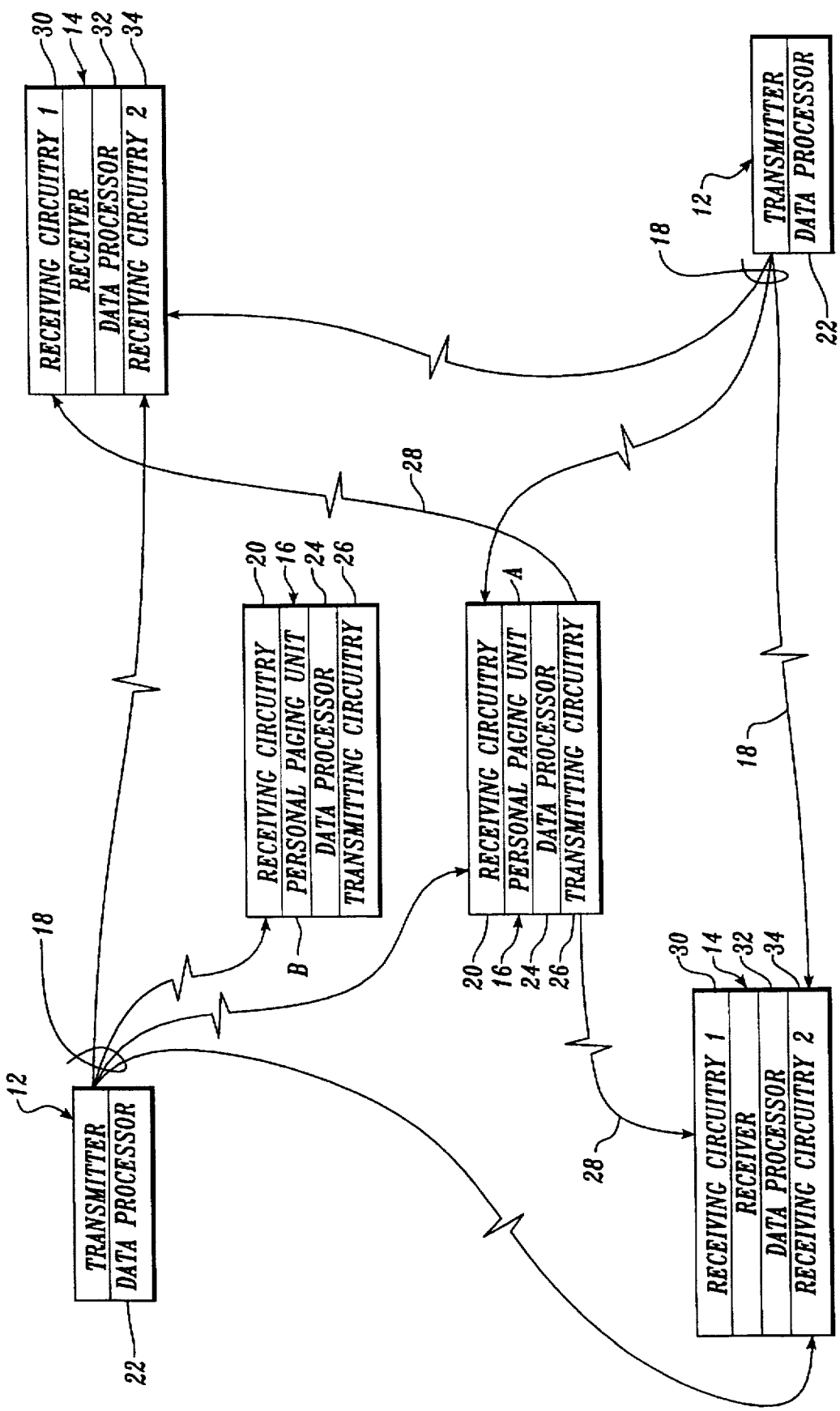
FIG. 1 is a schematic diagram of a preferred embodiment of a two-way paging system in accordance with the present invention, having receivers that include first and second receiving circuitry.

With reference to FIG. 1, a two-way paging system 10 in accordance with the present invention includes a plurality of transmitters 12, a plurality of receivers 14, and a plurality of two-way personal paging units 16. As discussed more fully below, the transmitters 12, receivers 14, and personal paging units 16 each include a data processor, such as a conventional microprocessor. The data processor is electronically linked to its associated component, either through electrical connections, fiber optic cables, radio channels, or other communication methods for controlling the component and performing data processing functions.

The transmitters 12 each generate radio signals or pages 18 on a first frequency channel, called a forward channel. Each page 18 identifies one of the personal paging units 16 to which the page is directed. At least some pages 18 command a response. Pages 18 commanding a response, specify a time slot or period for the identified personal paging unit 16 to respond. Operation of the transmitter 12 is controlled by its associated data processor 22.

The personal paging units 16 are small, battery powered devices that each include conventional receiving circuitry 20. This conventional receiving circuitry 20 receives the pages 18 from the transmitters 12. Each personal paging unit 16 also includes a data processor 24. The data processor 24 in each personal paging unit 16 determines whether a received page 18 identifies that personal paging unit. If that determination is affirmative, and the page 18 commands a response, the data processor 24 causes the conventional transmitting circuitry 26 in the unit to generate a radio signal 28 within the bounds of the time slot or period specified in the page.

For example, in FIG. 1 a first personal paging unit 16 is identified with the letter A, while a second personal paging unit is identified with the letter B. Both personal paging units 16 receive the page 18, but the page identifies the first personal paging unit A and commands a response during a specified time slot. Hence, only the first personal paging unit 16 generates a radio signal 28 during the time slot specified in response to the page 18.

Preferably, all pages 18 will command a response that at least acknowledges that the personal paging unit 16 received the page. However, there may be situations where a page 18 does not command a response. A command for a response may be indicated simply by specifying a time slot or period for response. If the page 18 does not specify a time slot or period for responding, then the page does not command a response.

Generally, each personal paging unit 16 that receives a page 18 identifying that unit will issue an audible alert, vibrate, or issue some other signal, regardless of whether the identifying page requests a response. Thus, the identified personal paging unit 16 notifies a person carrying the unit that the unit has received a page 18 directed to that unit. Hence, the person can check the personal paging unit display for a message, or take other appropriate action in response to the page. For example, the person could manually cause the personal paging unit 16 to generate a radio signal that communicates information requested in or in response to the page 18.

4

There may be situations though, where a paged personal paging unit 16 does not issue a signal to notify the person carrying the unit that a page has been received identifying that unit. For example, if the personal paging unit 16 can supply all of the information requested in a page 18, then there may be no need to notify the person carrying the unit that a page identifying the unit has been received.

The transmitters 12 broadcast the pages 18 within a frame 52 as schematically illustrated in FIG. 4. Each frame 52 includes a synchronization portion 54 having synchronization information, followed by a message portion 56. The message portion 56 includes a plurality of pages 18 directed to different personal paging units 16. In the conventional paging protocol called "FLEX," each frame is nominally 1.875 seconds in duration.

Returning to FIG. 1, the receiving circuitry 20 in each personal paging unit 16 receives the synchronization portion of a frame 54, and makes the synchronization information therein available to the data processor 24 in the unit. If one of the pages 18 identifies that personal paging unit 16 and requests a response, the data processor 24 in the unit relies on the synchronization information to cause the unit's transmitting circuitry 26 to generate a radio signal 28 within the time slot specified in the identifying page 18. The synchronization portion includes information indicative of the frame number and time slot boundaries. Individual time slots can be identified as a fixed offset from where the synchronization portion 54 occurs.

First receiving circuitry 30 in each receiver 14 receives the reverse channel radio signals 28 from the personal paging units 16. Preferably, the radio signal 28 identifies the personal paging unit 16 that generated the signal. Based on the identification, a data processor 32 in each of the receivers 14 determines which personal paging unit 16 has responded to a page 18 in a frame 52.

Alternatively, since the personal paging units 16 respond to pages 18 during specified time slots or periods, the data processors 32 in the receivers 14 can determine which personal paging unit 16 responded based on the time slot or period during which the receiver received the response. This alternative method has an advantage because the response can include more information. Specifically, none of the broadcast time in the responsive radio signal 28 is required to identify the responding personal paging unit 16, and this time can therefore be used for communicating other information.

The paging system 10 employs a plurality of spaced apart transmitters 12 and receivers 14 to extend the communication coverage of the system. In particular, the paging system 10 can maintain communication with the personal paging units 16 over a greater geographical area because the transmitters 12 and receivers 14 extend over a greater geographical area. Thus, while one or more transmitters 12 may not have the ability to communicate with a distant personal paging unit 16, the transmitter 12 nearest the unit may still be able to maintain communications. Similar logic applies to the receivers 14.

The specification of time slots or periods for response also maximizes or extends the communication coverage of the paging system 10. First, use of time slots or periods prevents simultaneous transmissions, sometimes called "collisions." That is, dedicated time slots or periods prevent the receivers 14 from receiving simultaneous broadcasts from two or more personal paging units 16. This also serves to maximize the effective coverage of the paging system 10. A first personal paging unit 16 may be at the extreme limit of its communication abilities due to distance, low battery power conditions, or other signal strength obstacles. If the receivers 14 were to receive a stronger radio signal or signals from other personal paging units 16 simultaneously with a weaker signal from the first personal paging unit, the weaker radio signal may be overpowered and not received or properly processed by the receivers.

The time slots or periods are set to the smallest amount of time practical for communicating required information from a personal paging unit 16 to the receivers 14 during a time slot. In most areas of the world, government regulations limit the bandwidths for the forward and reverse channels. Thus, the paging system 10 minimizes the slot duration time so that communications can be maintained with the greatest number of personal paging units 16 for a given bandwidth. Required information may include error checking data, data required to identify the responding personal paging unit 16, and/or other data. Factors such as information transmission rate, e.g. baud rate, and signal propagation time, and/or other factors determine the lower limit for time slot duration. In general, the duration for the time slot or period is less than one hundred milliseconds. Hence, the components of the paging system 10 must be closely synchronized with each other so that communications occur during the specified time slots.

As discussed previously, each frame 52 includes an initial synchronization portion 54 that the data processor 24 in each personal paging unit 16 relies on for synchronization purposes. Specifically, the data processor 24 in the unit 16 causes the unit's transmitting circuitry to generate a radio signal 28 response within the proper time slot on the reverse channel based on the synchronization information.

Additionally, each receiver 14 includes second conventional receiving circuitry 34. The second receiving circuitry 34 monitors the forward channel and communicates information received to the receivers' data processors 32. Based on the synchronization information in each frame 52, the data processors 32 in the receivers 14 accurately determine the time slot or period during which a reverse channel radio signal 28 is received. Thus, the receivers 14 do not have to multiplex back and forth between the forward and reverse channels, which may be impractical, to have access to synchronization information.

Preferably, the transmitters 12 broadcast a frame 52 at regular, periodic intervals. Thus, each receiver 14 could use its second receiving circuitry 34 and/or data processor 32 to sample the forward channel at a given sample rate. Because the transmitters 12 transmit the frames 52 at a constant periodic rate, the data processor 32 in the receiver 14 can adjust its internal clock based on the number of samples obtained between each frame.

For example, assume the transmitters 12 broadcast the frames 52 every 1.875 seconds according to the previously mentioned FLEX protocol. The second receiving circuitry 34 and/or data processor 32 in each receiver 14 could sample the forward channel at a rate of 204,800 samples/second. Since 204,800 samples/second multiplied by 1.875 seconds is 384,000 samples, 384,000 samples would be taken during each frame 52.

The data processor 32 in each receiver 14 could determine if more or less samples were obtained during each frame 52. If the data processor 32 determined more than 384,000 samples were obtained during a frame 52, the data processor 32 could slow its internal clock to more closely synchronize with the transmitters 12. Similarly, the data processor 32 would advance its internal clock if the data processor determined that less than 384,000 samples were obtained during a frame 52. The receiving circuitry 34 and/or data processor 32 in each receiver 14 can rely upon receipt of the synchronization portion 54 in each frame 52 to distinguish one frame from the next.

Very small synchronization errors can be detected if the data processor 32 determines whether a correct number of samples is obtained for several consecutive frames 52. Based on the foregoing example, 3,840,000 samples would be expected for every ten frames. Thus, if the data processor 32 determines whether the expected number of samples is obtained for every ten frames, the detected error could be as small as 1/3,840,000. Clearly, even smaller errors can be detected if the data processor 32 determines whether an expected number of samples is obtained for a number of consecutive frames greater than ten, and/or if the data sample rate is increased.

Additionally, this error detection function can continue even if the transmitters 12 do not broadcast every frame 52, so long as broadcast of the frames occurs at multiples of the periodic rate, which is 1.875 seconds per frame in the foregoing example. More particularly, if a receiver 14 does not receive every frame 52, the data processor 32 in the receiver can determine the number of frames expected to have been received, and determine whether an expected number of samples is being obtained based on a combination of expected frames and received frames.

Generally, in the embodiments of the paging systems described herein, the systems will employ a greater number of receivers 14 relative to the number of transmitters 12. To reduce costs, the receivers 14 employ data processors 32 having internal clock circuitry that is less robust and subject to greater inaccuracies relative to corresponding circuitry in the transmitters 12. For example, temperature changes and age usually have a greater adverse impact on clock accuracy in the receivers 14. Closely synchronizing the receivers 14 to the transmitters 12 permits the receivers to achieve substantially the same level of timing accuracy as the transmitters.

Additionally, the receivers 14 employ phase lock frequency synthesizer techniques for demodulating signals, wherein the receivers produce synthesized frequencies based on timing information provided by an internal clock in each receiver. Close synchronization of each receiver's internal clock with the transmitters 12 permits the receivers 14 to produce synthesized frequencies having an accurate, predefined relationship to the radio signal frequencies produced by the personal paging units 16. The accurate production of the synthesized frequencies permits the receivers 14 to selectively filter out most extraneous signals, even signals having frequencies close to the radio signal frequencies from the personal paging units 16. Thus, communications can be maintained even in noisy environments.

Further, when the receivers 14 closely synchronize with the personal paging units 16 and the transmitters 12, the paging system 10 can more effectively eliminate "false" messages and/or other noise. More particularly, one or more receivers 14 may receive a faint or garbled signal due to low battery power conditions, electromagnetic interference, distance, or other communication obstacles. To extract intelligible information from the faint or garbled signal, the signal will require data processing.

However, the signal may be from a source other than from one of the personal paging units 16, such as a secondary "ghost" signal caused by a reflected signal from a building or other structure, or other noise. In these situations, the signal is said to be "false." The data processors 32 in the receivers 14 can readily detect many false signals by determining whether the first receiving circuitry 30 received the signal within a single time slot or period. Since the personal paging units 16 only transmit signals 28 during a specified time slot or period, any signal exceeding one or more time slot boundaries is probably a false signal. Therefore, the data processors 32 in the receivers 14 can discard faint or garbled signals that exceed a time slot boundary, thus conserving processing time that the data processors would otherwise spend attempting to extract intelligible information from such a signal.

Figure 2:
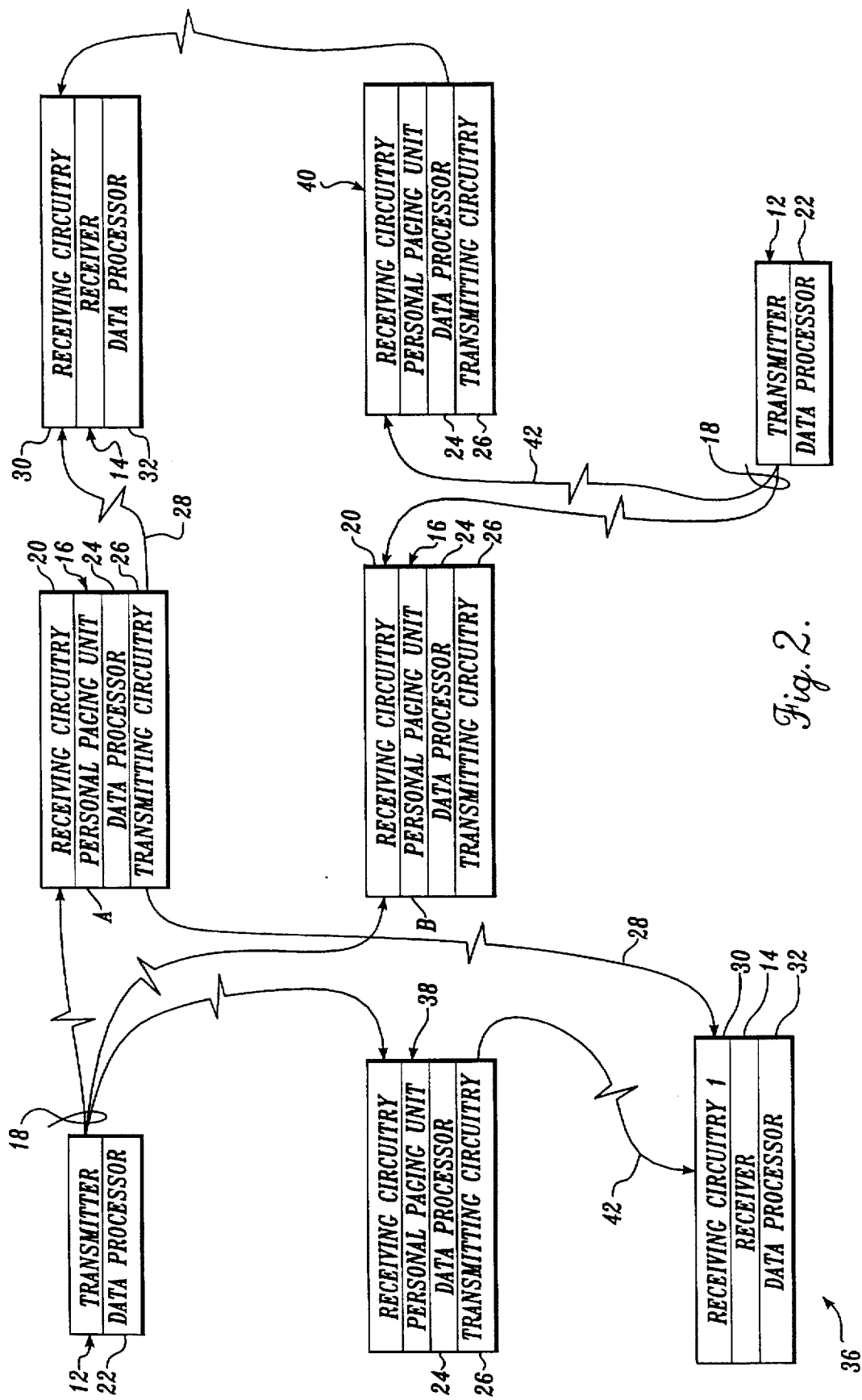
FIG. 2 is a schematic diagram of an alternative embodiment of the invention, in which a personal paging unit ("timing unit") serves as the second receiving circuitry in the receivers.

The alternative embodiment of a paging system 36 in accordance with the present invention shown in FIG. 2 is substantially identical to the paging system 10 shown in FIG. 1, except that the receivers 14 rely on selected personal paging units 38 and 40 ("timing units") to serve as the second receiving circuitry. That is, the timing units 38 and 40 serve as inexpensive receiving circuitry for the receivers 14 to monitor the forward channel from the transmitters 12.

Preferably, the transmitters 12 broadcast a frame 52 (see FIG. 4) at regular, periodic intervals, which the timing units 38 and 40 receive in the same manner as the previously described personal paging units 16. However, the data processors 24 in the timing units 38 and 40 are not programmed to determine whether a page 18 in each frame 52 identifies that unit as with the previously described personal paging units 16. In contrast, the data processors 24 in the timing units 38 and 40 are programmed to cause the timing unit's transmitting circuitry 26 to generate a responsive radio signal 42 during a predefined time slot or period in response to every frame 52. More particularly, the data processors 24 cause the transmitting circuitry 26 to generate the response radio signal 42 upon detecting the synchronization portion 54 of each frame 52.

The first receiving circuitry 30 in each of the receivers 14 receives the response signal 42. Since the transmitters 12 periodically broadcast each frame 52, the timing units 38 and 40 periodically generate the response signals 42. The receivers 14 can closely synchronize with the transmitters 12 based on when the receivers receive a response radio signal 42. The data processors 24 in the receivers 14 closely synchronize with the transmitters 12 in the same manner as discussed for the paging system 10 shown in FIG. 1. Alternatively, the timing units 38 and 40 are modified to generate signals 42 in a format having synchronization information and other information identifying the timing unit that the data processor 32 in each receiver relies on in determining the current time slot.

Preferably, the timing units are located proximate to each receiver 14 to prevent simultaneous receptions. More particularly, the receivers 14 are spaced far enough apart that a timing unit 38 or 40 at one receiver cannot generate a radio signal that will reach the next closest receiver. Thus, the timing units 38 and 40 may respond during the same time slot or period.

Optionally, the transmitters 12 in the paging system 36 of FIG. 2 may repeatedly page the timing units 38 and 40 at a periodic interval. Specifically, each frame 52 would include a page 18 identifying a timing unit 38 or 40, and commanding the identified unit to respond. The page 18 would specify the same time for response in each frame 52 broadcast by the transmitter 12. Preferably, the timing units 38 and 40 have the same identification so that a single page 18 causes both units 38 and 40 to respond.

In this optional configuration, the data processors 24 in the timing units 38 and 40 would act in the same manner as any other personal paging unit 16. Namely, upon receipt of a page 18 identifying the unit 38 or 40, the unit would generate a radio signal response 42 during the time slot or period specified in the page. Since the transmitters 12 periodically broadcast frames 52 including the pages 18, and the pages always specify the same time for response, the receivers 14 receive periodic response signals 42 as previously described.

The paging system 36 shown in FIG. 2 has an advantage in that the receivers 14 do not require a separate antenna for monitoring the forward channel from the transmitters 12. In particular, the timing units 38 and 40 are small devices that require minimal space, and hence reduce the space, and fees, for sites for the receivers 14.

The single antenna advantage may also be provided for the paging system 10 of FIG. 1 because the receivers 14 generally receive a strong signal from one of the transmitters 12. Thus, the receivers 14 may have a single antenna with two outputs. One output connects to the first receiving circuitry 30 in the receivers, and the other output connects to the second receiving circuitry 34. However, this arrangement can have a slight adverse impact on communication coverage because the split antenna output slightly reduces the input signal to the receiving circuitries 30 and 34. Additionally, the receivers 14 should not use a single antenna unless the forward and reverse channel frequencies are close to one another, or are not adversely affected by either the antenna bandwidth or external filtering.

An advantage of both the paging systems 10 and 36 illustrated in FIGS. 1 and 2, respectively, is that they provide a way for detecting an error condition. If the forward channel receiving circuitry in the receivers 14 suddenly stops receiving frames 52 from the transmitters 12, there is an error condition in the paging systems 10 or 36.

FIG. 3 illustrates another alternate embodiment of a paging system 44 in accordance with the present invention. The paging system 44 shown in FIG. 3 is substantially identical to the paging system 10 shown in FIG. 1 with two major exceptions. One, each transmitter 12 has receiving circuitry 46 adapted for receiving radio signals 48 from orbital global positioning satellites 50. Two, the second receiving circuitry 34 in each receiver 14 is adapted for receiving the same radio signals 48 from the satellites 50.

The radio signals 48 from each satellite 50 include timing information that the data processors 22 and 32 in the transmitters 12 and receivers 14, respectively, use to determine the current time slot. Additionally, the radio signals 48 include location information that the receiving circuitry 46 decodes.

In particular, conventional global positioning satellite ("GPS") receiving circuitry typically includes the ability to decode timing and location information in a signal from a global positioning satellite. The receiving circuitry 34 and 46 in the receivers 14 and transmitters 12 decodes the timing and location information and makes time information, in an absolute sense, available for data processing. Preferably, the receiving circuitry 34 and 46 in the receivers 14 and transmitters 12 receive signals 48 from multiple satellites 50 for accurate determination of the current time.

Thus, the paging system shown in FIG. 3 synchronizes the receivers 14 and transmitters 12 with external timing information. In particular, the receivers 14 and transmitters 12 are synchronized with timing information received from global positioning satellites 50.

An advantage of the paging systems 10, 36, and 44 disclosed herein is that some radio signals 28 from personal paging units 16 may include information that is too extensive to transmit within a single time slot. The radio signal 28 may transmitted in a series of time slots, which are thereafter combined so that all of the information is available.

Additionally, parts of a weak radio signal 28 may be received by one receiver 14, while other parts are received by another receiver. Based on the time slot or slots in which the signal is received, the parts of the signal can be combined into a complete whole.

Furthermore, the paging systems 10, 36, and 44 avoid using telephonic links to synchronize the transmitters 12 with the receivers 14. A problem with telephonic links is that telephone service providers can reroute telephone links through different telephone connections without prior notice, which adds or subtracts a few milliseconds to the telephonic link. This severely limits the accuracy of the synchronization between the transmitters 12 and the receivers 14.

While the preferred embodiments of the invention have been illustrated and described, it will be appreciated that various changes can be made therein without departing from the spirit and scope of the invention. For example, a central data processor could link each of the receivers 14 to one another, rather than having a separate data processor 32 for each receiver. A similar arrangement could be implemented for the transmitters 12. External timing data could be relied on from satellites other than global positioning satellites 50. In view of these and other alterations, substitutions and modifications that could be made by one of ordinary skill in the art, it is intended that the scope of letters patent granted hereon be limited only by the definitions of the appended claims.

The embodiments of the invention in which an exclusive property or privilege is claimed are defined as follows:

1. A two-way paging system, comprising:
   (a) a transmitter for generating frames having pages the transmitter including first timing means;
   (b) a plurality of personal paging units that receive pages from the transmitter, and which generate response signals at predetermined time periods specified in the frames;
   (c) a receiver having first and second receiving circuitry, the first receiving circuitry receiving radio signals from the personal paging units, and the second receiving circuitry receiving radio signals from a source other than the personal paging units, the receiver also including second timing means distinct from the first timing means; and
   (d) first data processing means, electronically linked with the first and second receiving circuitry in the receiver, for identifying the radio signals and their source by determining the time periods during which the radio signals are received from the personal paging units by the first receiving circuitry, based on radio signals received from the other source by the second receiving circuitry the first data processing means configurable to synchronize the second timing means with the first timing means.

2. The two-way paging system of claim 1, wherein the transmitter generates frames each including a plurality of pages, and wherein the second receiving circuitry receives radio signals in the form of frames from the transmitter.

3. The two-way paging system of claim 2, wherein each frame generated by the transmitter includes a synchronization portion having information indicative of the time the frame was generated, and the first data processing means determines the time period radio signals are received from the personal paging units based on the information in the synchronization portion in the frames received from the transmitter by the second receiving circuitry.

4. The two-way paging system of claim 2, wherein the second receiving circuitry includes a selected one of the personal paging units.

5. The two-way paging system of claim 4, wherein the selected one of the personal paging units is located proximate to the first receiving circuitry.

6. The two-way paging system of claim 4, wherein the selected one of the personal paging units receives frames from the transmitter, said selected one of the personal paging units including means for generating a radio signal in response to each frame received.

7. The two-way paging system of claim 4, wherein at least some pages generated by the transmitter specify a time period for responding to the page, and identify one of the personal paging units that the page is directed to, further comprising second data processing means electronically linked to the transmitter, the second data processing means causing the transmitter to repeatedly generate a page identifying the selected one of the personal paging units.

8. The two-way paging system of claim 7, wherein the first data processing means determines the time period during which radio signals are received from the personal paging units based on radio signals received by the first receiving circuitry from the selected one of the personal paging units.

9. The two-way paging system of claim 2, wherein the transmitter generates the frames at a predefined periodic rate, and the first data processing means determines the time period during which radio signals are received from the personal paging units based at least in part on the predefined periodic rate at which the transmitter generates frames.

10. The two-way paging system of claim 1, wherein the transmitter generates pages on a first frequency channel, and the personal paging units generate response signals on a second frequency channel.

11. The two-way paging system of claim 1, wherein the other source of radio signals is a satellite.

12. The two-way paging system of claim 1, wherein the transmitter includes transmitter receiving circuitry for receiving radio signal from the other source.

13. The two-way paging system of claim 2, wherein the other source of radio signals is a satellite.

14. A two-way paging system, comprising:
   (a) a plurality of personal paging units, each of the personal paging units including:
      (i) receiving circuitry for receiving paging radio signals in the form of frames, each frame including a plurality of pages, wherein at least some of the pages specify a time period for responding, and identify one of the personal paging units that the page is directed to;
      (ii) transmitting circuitry for generating responsive radio signals; and
      (iii) personal paging unit data processing means electronically linked to the receiving and transmitting circuitry for determining whether a page identifies the personal paging unit, the time period specified in a page identifying the personal paging unit, and causing the transmitting circuitry to generate radio signals during the time period specified in a page identifying the personal paging unit receiving the page, wherein a selected one of the personal paging units generates a responsive radio signal in response to each frame received;

(b) a transmitter for generating frames, each frame including a plurality of pages: the transmitter having first timing means;

(c) a receiver for receiving radio signals from the personal paging units the receiver having second timing means distinct from the first timing means;

(d) transmitter data processing means electronically linked to the transmitter, the transmitter data processing means causing the transmitter to repeatedly generate the frames; and (e) receiver data processing means electronically linked to the receiver for identifying the radio signals and their source be determining the time periods the radio signals are received from the personal paging units, based on responsive radio signals received from the selected one personal paging unit the receiver data processing means configurable to synchronize the second timing means with the first timing means.

15. The two-way paging system of claim 14, wherein the selected personal paging unit is located proximate to the receiver.

16. The two-way paging system of claim 14, wherein the transmitter data processing means causes the transmitter to generate pages identifying the selected personal paging unit at substantially equal intervals of time.

17. A method for synchronizing a receiver with a transmitter in a paging system having two-way personal paging units, comprising the steps of:

(a) causing the transmitter to generate frames having pages, wherein each frame includes a synchronization portion having information indicative of the time each frame was generated, and wherein each page specifies a time period for responding to the page;

(b) receiving radio signals from the personal paging units with first receiving circuitry associated with the receiver at predetermined time periods;

(c) receiving radio signals from a source other than the personal paging units with second receiving circuitry associated with the receiver; and (d) identifying the radio signals and their source by determining the time periods during which radio signals are received from the personal paging units by the first receiving circuitry, based on radio signals received from the other source by the second receiving circuitry.

18. The method of claim 17, further comprising the steps of:

(a) receiving frames from the transmitter with the second receiving circuitry; and (b) determining the time period radio signals are received from the personal paging units based upon the information in the synchronization portion of the frames received from the transmitter by the second receiving circuitry.

19. The method of claim 17, further comprising the steps of:

(a) receiving radio signals from a satellite with the second receiving circuitry;

(b) receiving radio signals from a satellite with transmitter receiving circuitry in the transmitter; and (c) determining the time period radio signals are received from the personal paging units based upon radio signals from a satellite.

20. The method of claim 17, further comprising the steps of:

(a) selecting one of the personal paging units to act as a timing personal paging unit;

(b) receiving the frames with the timing personal paging unit;

(c) causing the timing personal paging unit to generate a radio signal in response to each frame received from the transmitter;

(d) receiving the radio signals from the timing personal paging unit with the second receiving circuitry; and (e) determining the time radio signals are received from the other personal paging units based on radio signals received from the timing personal paging unit by the second receiving circuitry.

21. The method of claim 17, further comprising the steps of:

(a) identifying one of the personal paging units that the page is directed to;

(b) selecting one of the personal paging units to act as a timing personal paging unit;

(c) causing the transmitter to repeatedly page the timing personal paging unit;

(d) receiving radio wave signals from the timing personal paging unit with the second receiving circuitry; and (e) determining the time radio wave signals are received from the personal paging units based on radio wave signals received from the timing personal paging unit by the second receiving circuitry.

22. The method of claim 17, further comprising the steps of:

(a) causing the transmitter to generate frames at a predefined periodic rate;

(b) sampling the frames from the transmitter at a second predefined periodic rate based on timing information from the receiver;

(c) calculating an expected number of samples that would be obtained for a predefined number of frames assuming the first and second predefined periodic rates to be accurate;

(d) counting an actual number of samples obtained from the transmitter at the second predefined periodic rate for the predefined number of frames; and (e) determining the accuracy of the timing information from the receiver based on the difference between the expected number of samples and the actual number of samples.

* * * * *